Aug. 11, 1970  H. J. SHOCKEY  3,523,994
METHOD FOR BEDDING PANELS INTO FRAMES
Filed Feb. 18, 1966  5 Sheets-Sheet 1

Inventor
HOWARD J. SHOCKEY
By
Wilson, Settle, Batchelder
ATT'YS.  & Craig

Aug. 11, 1970   H. J. SHOCKEY   3,523,994
METHOD FOR BEDDING PANELS INTO FRAMES
Filed Feb. 18, 1966   5 Sheets-Sheet 2

Inventor
HOWARD J. SHOCKEY
By
Wilson, Settle, Batchelder
& Craig
Attys.

Inventor
HOWARD J. SHOCKEY

By
Wilson, Settle, Batchelder
ATT'YS. & Craig

Aug. 11, 1970   H. J. SHOCKEY   3,523,994
METHOD FOR BEDDING PANELS INTO FRAMES
Filed Feb. 18, 1966   5 Sheets-Sheet 5
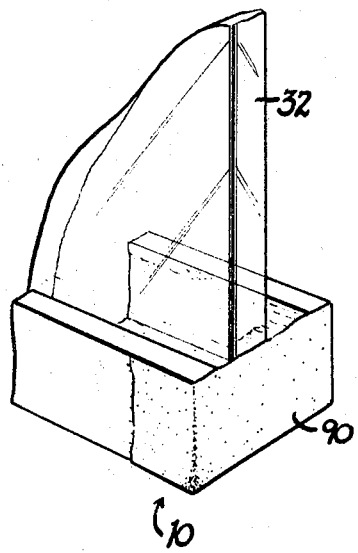
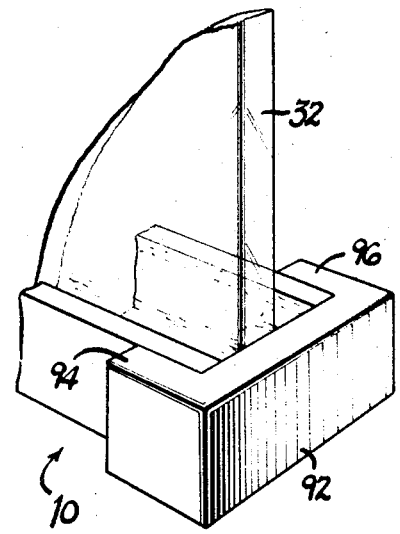
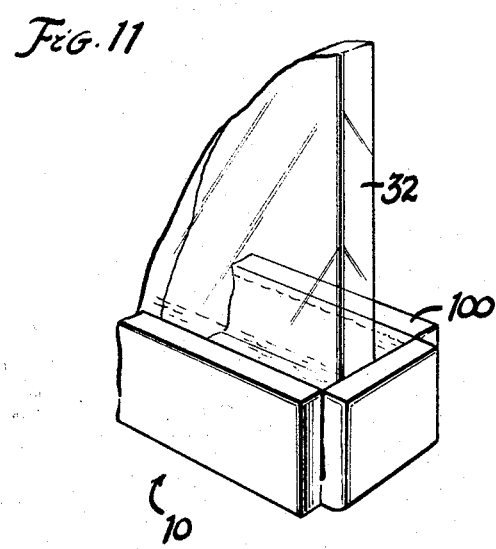
Inventor
HOWARD J. SHOCKEY
By
Wilson, Settle, Batchelder
ATT'YS.   & Craig

United States Patent Office 3,523,994
Patented Aug. 11, 1970

3,523,994
METHOD FOR BEDDING PANELS INTO FRAMES
Howard J. Shockey, Elkhart, Ind., assignor to Excel Corporation, Elkhart, Ind., a corporation of Indiana
Filed Feb. 18, 1966, Ser. No. 528,457
Int. Cl. B29d 12/00
U.S. Cl. 264—252          10 Claims

ABSTRACT OF THE DISCLOSURE

The present invention provides a method for bedding glass panels into metal frames wherein the frame channel is first filled with a liquid bedding material and then a marginal edge of the glass panel is inserted into the frame channel and into the liquid bedding material. The assembly is then subjected to heat whereby the liquid bedding material is cured to a solid form, providing adherence between the glass and the metal of the channel to result in a final window assembly in which the glass panel is firmly bedded into the metal channel. In the process, the metal channel is dammed at two locations spaced from each other along the length of the frame member to form a cavity capable of holding the liquid in the recess, it being appreciated that the channel-type frame is open-ended.

---

This application is related to a copending application of Robert J. Deisenroth, Ser. No. 222,590, filed on Sept. 10, 1962, and assigned to the present assignee.

This invention relates to a method of bedding panels into frames, and more particularly to a method of bedding in which a frame is converted into a container, and an edge portion of a panel is immersed in liquid bedding material in the container followed by curing of the liquid to a solid form.

The present invention is particularly useful in bedding automotive window glass into frames, although the invention is not limited to this application. Window glass in automobiles frequently has a metal frame along at least one side of the glass, and in some cases two or more sides are framed. One known way of bedding the glass into the frame involves the use of strips of rubber. A worker covers an edge of a pane of glass with a strip of oil coated unvulcanized rubber and inserts the rubber covered edge into a frame. Any excess rubber is manually trimmed off. Different thickness of rubber may be used to accommodate different glass thicknesses.

Because of the relatively high labor costs of this manual method, it has been proposed to mechanize the method. However, the use of different tape thicknesses and the trimming off of excess material are difficult to automate, and no method of this type has been successfully mechanized.

It has been proposed to bed glass panels in metal frames by injecting liquid bedding material between the frame and panel and subsequently curing the liquid to a solid form. This method has many advantages over the method using rubber strips. It automatically compensates for variations in glass thickness, does not require trimming, is a clean procedure and does not require washing or cleaning of the glass and frame assembly, and provides a water-tight seal without the use of additional sealers. A method of this type is described in a copending application of Robert J. Deisenroth Ser. No. 222,590 filed Sept. 10, 1962, which has matured into U.S. Pat. No. 3,263,014 and assigned to the assignee of this application and reference may be made thereto for additional information on the method.

In the method of that application, the glass is positioned in a channel frame and the space between the edges of the frame and the glass is sealed to form a liquid-tight cavity. Liquid bedding material is then injected into the cavity and is cured by heat to form a solid, resilient bed for the glass in the frame. The requirement for sealing the edges of the frame limits the usefulness of the method in some applications, and a method wherein such sealing is not required would be desirable. It would also be desirable to have more flexibility as to what stage of the processing the edge of the panel is inserted into the frame.

According to the present invention, a panel is bedded into a frame member having a surface forming a recess by the following steps:

(a) Damming the recess at two locations spaced from each other along the length of the frame member to form a container capable of holding a liquid in the recess, (b) Immersing a marginal edge of the panel in liquid bedding material at least partially filling the container, and (c) Heating the bedding material in the container until it is cured to its solid form.

By damming the channel surface, the frame is converted to a container. Consequently, straight, open-ended sections of frame may be used in carrying out the method. The frame may be dammed at its ends or at any two points spaced inward from its ends if desired. The immersion step may be carried out by first supplying liquid bedding material into the container and then inserting the edge of the panel, or the panel's edge may be inserted first followed by injection of the liquid bedding material. In either case the liquid is solidified by heat to provide a resilient, water-tight bed for the panel in the frame.

It is, therefore, an object of the invention to provide a method of bedding panels into straight, open-ended frame members.

Another object of the invention is to provide a method of bedding in which there is no need to seal the edges of the frame into which a panel is bedded.

A further object of the invention is to provide a method of bedding wherein a straight, open-ended frame having a channel section is converted into a container by placing damming material transversely across the channel surface of the frame at two locations.

Another object of the invention is to provide a method of bedding wherein allowance is made for the bedding material displaced by the edge of the panel such that there is no overflow of bedding material.

Other objects of this invention will appear in the following description and appended claims, reference being had to the accompanying drawings forming a part of this specification wherein like reference characters designate corresponding parts in the several views.

On the drawings:

FIG. 9 is a fragmentary perspective view illustrating the use of adhesive tape to dam one end of a frame member in which a panel is embedded;

FIG. 10 is a fragmentary perspective view illustrating an embodiment wherein an end cap is placed on the end of the frame member; and FIG. 11 is a fragmentary perspective view wherein a part of the frame itself is bent to form a dam.

Before explaining the present invention in detail, it is to be understood that the invention is not limited in its application to the details of construction and arrangement of parts illustrated in the accompanying drawings, since the invention is capable of other embodiments and of being practiced or carried out in various ways. Also, it is to be understood that the phraseology or terminology employed herein is for the purpose of description and not of limitation.

Figure 1:
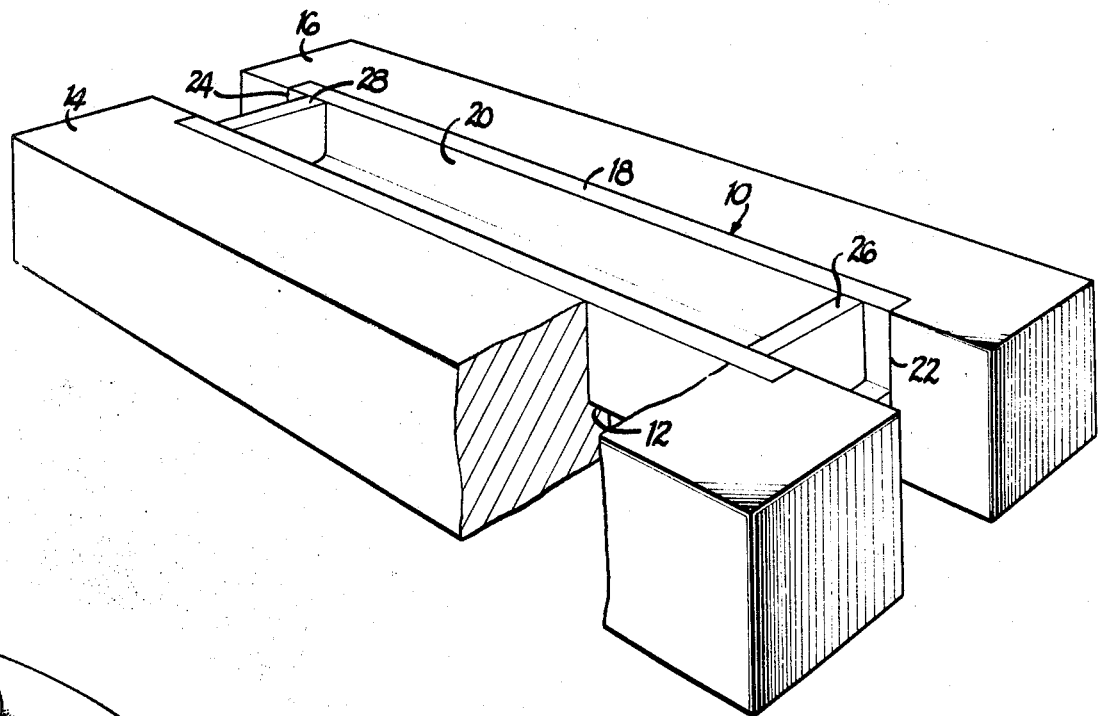
FIG. 1 is a perspective view illustrating the first step of the method wherein dams are placed across a channel frame member which is retained in a fixture in this view.

As shown on the drawings:

FIGS. 1 through 4 illustrates the steps of one method embodiment of the invention. Referring first to FIG. 1, there is shown a frame member 10 supported on recessed shelves 12 formed in two elongated blocks 14 and 16. The blocks 14 and 16 extend parallel to each other and are recessed both laterally and vertically so as to receive the frame member 10 and hold it in a position wherein its top edge 18 is flush with the top surfaces of the blocks. The frame member 10 has an interior channel surface 20 in which a glass panel is to be bedded. Although a channel-shaped frame is used in the illustrative embodiments described herein, it is to be understood that frames of other configurations, such as an L-shaped configuration could be used. The ends 22 and 24 of the frame member are open, and if nothing were done to close these ends the bedding material would simply run out the ends of the frame when injected into the frame in a liquid condition. Consequently, dams 26 and 28 are placed at two locations spaced from each other along the length of the frame 10. In this embodiment, the dams 26 and 28 are placed just inside the ends 22 and 24 of the frame.

The dams may be solid fairly rigid bodies as are the dams 26 and 28 shown in FIG. 1. However, alternatves are available as will be described further herein. The dams 26 and 28 may be blocks of yieldable rubber material which may be pressed into the channel surface 20 and have a tight fit therein to prevent leakage of liquid bedding material when it is introduced into the recess within the frame 10. The tops of the dams 26 and 28 may be flush with the top edge 18 of the frame, thus allowing the frame to be filled nearly to the top edge thereof.

Figure 2:
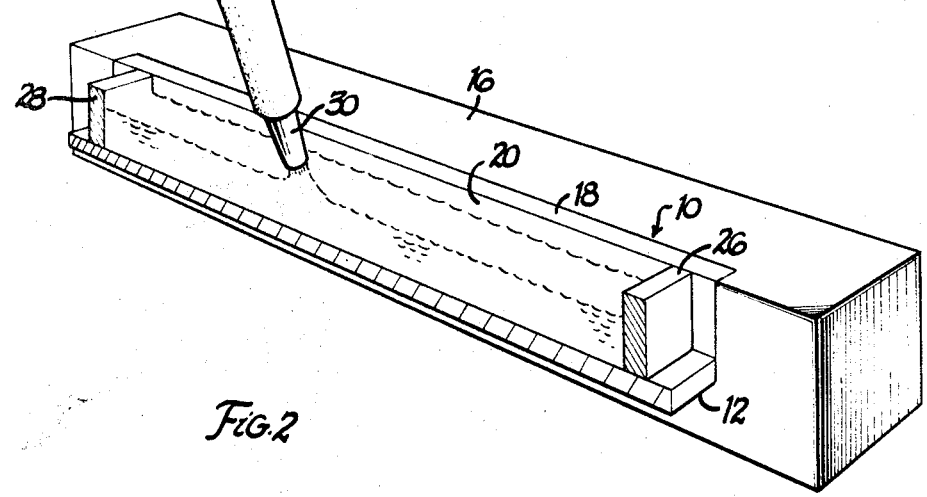
FIG. 2 is a schematic perspective view, partly in section, showing the container formed in FIG. 1 being filled with liquid bedding material.

In FIG. 2 block 14 has been omitted and a vertical section has been taken through the frame member 10 so as to show more clearly the dams 26 and 28 and to show liquid bedding material flowing into the frame from a nozzle 30. The frame is filled up to a predetermined level which causes the frame to be full when the edge of a panel is later placed in the liquid therein. Allowance must be made for the liquid which will be displaced by the edge of the panel. This may be accomplished by injecting into the frame only a metered amount of the liquid bedding material which allows for displacement of some liquid by the edge of the panel when it is inserted.

Figure 3:
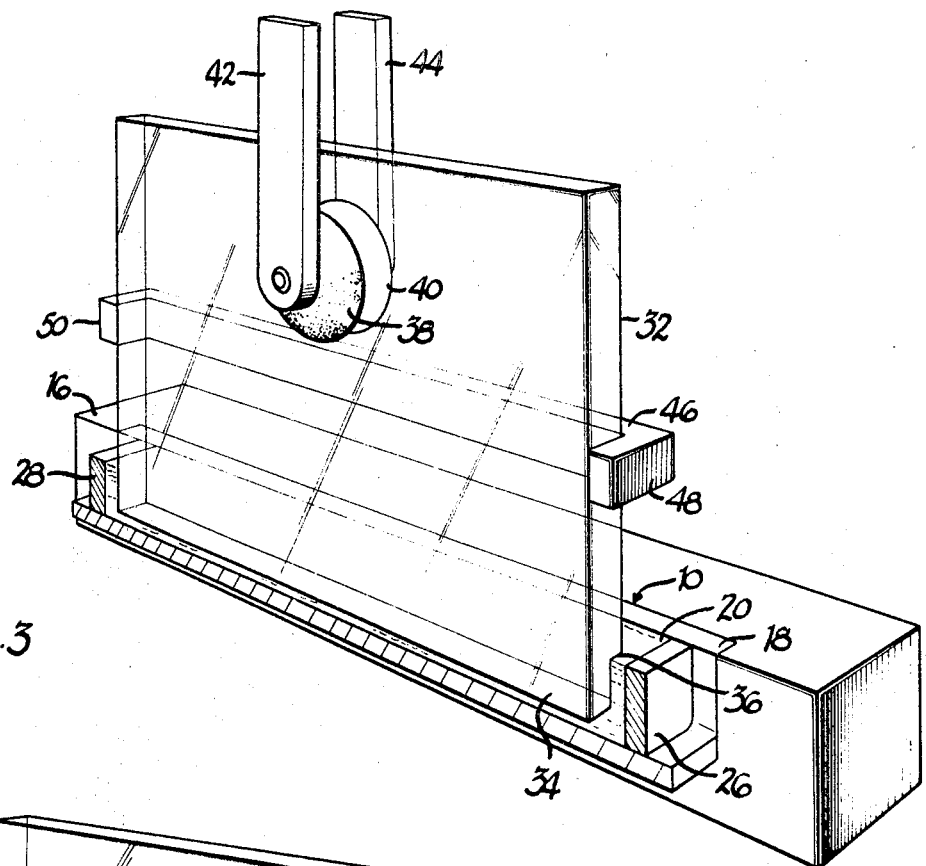
FIG. 3 is a perspective view, partly in section, showing a glass panel inserted at one edge into the liquid bedding material and apparatus for holding the panel in place.
Figure 4:
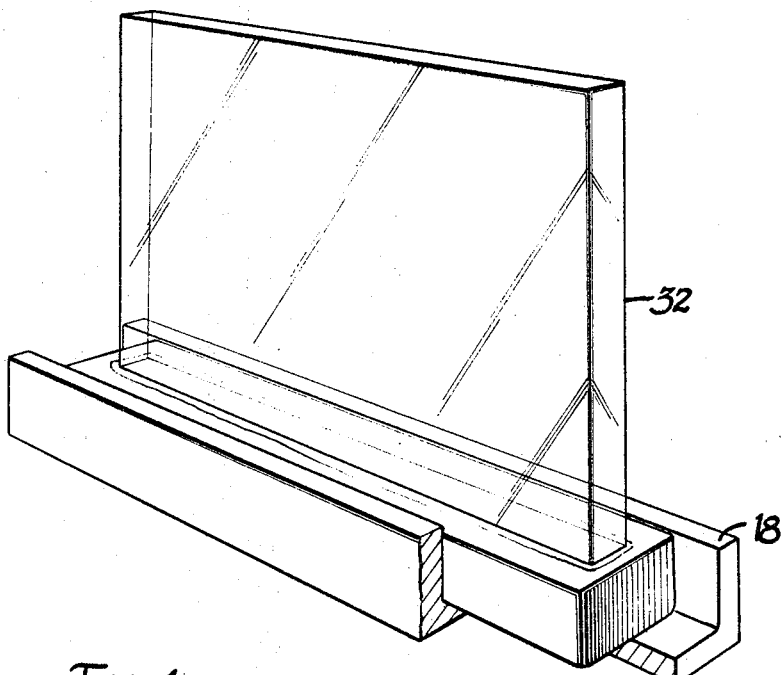
FIG. 4 is a perspective view with part of the frame broken away showing the finished assembly of frame, panel and bedding material.

FIG. 3 shows a glass panel 32 supported over the frame 10 in a position where its lower edge 34 is inside the frame and is immersed in the liquid bedding material therein. The frame 10 is filled very nearly to its top surface 18 with liquid bedding material. A meniscus forms along the interface 36 between the liquid and the glass and may also form at the interface between the liquid and the metal of the frame 10. This results in a humped surface at the interfaces. The panel 32 is supported by means of two suction cups 38 and 40 pressed against opposite sides of the panel by arms 42 and 44. The panel is positioned lengthwise within the frame and is held in position by a bracket 46 which has arms 48 and 50 embracing the panel and contacting it at opposite ends to hold it against lengthwise movement.

The next step is to cure the bedding material at an elevated temperature to harden it to a solid state. The entire assembly shown in FIG. 3 may be placed in an oven which is maintained at an elevated temperature and remains there a prescribed time until the bedding material is cured to a solid state. By way of example, the material may be cured at 250° F. for about 45 seconds. Alternatively, heating elements may be built into the block members 16 and 18, the heating elements being heated by current flow through the same to heat up the blocks and the frame to thereby heat the bedding material by conduction. The material might also be heated by high frequency induction heating or by direct conduction of current through the frame itself.

After the curing is completed, the clamping members 42, 44 and 46 may be removed, and the panel and frame assembly may be removed from the blocks 14 and 16. The lower edge of the panel is embedded in a solid, resilient bed which is adherent both to the panel and to the metal frame. No washing or other cleanup steps are required as the method is inherently a clean procedure.

The bedding material should have several properties to withstand the conditions to which it will be exposed. The bedding material may be any suitable resinous material which has the following properties:

(1) Resiliency—to provide a suitable bedding for the glass.

(2) Adherence—to provide a bond between the glass and metal frame.

(3) Curability—to a solid state in a relatively short time by the application of heat, for example, within about 45 seconds at about 250° F.

(4) Resistance to weathering (sunlight, temperature changes and moisture absorption).

(5) Mechanical properties such as tensile strength, compressive strength, impact resistance and toughness sufficient to withstand the stress normally encountered in use of the final assembly.

The bedding material may be any suitable thermoplastic or thermosetting plastic material. Once class of resins suitable as bedding materials are the polyurethane resins. Polyurethane resins are obtained by the reaction of polyisocyanates with organic compounds containing two or more active hydrogen atoms to form polymers having free isocyanate groups. Under the influence of heat, the free isocyanate groups react to form a thermosetting material. A suitable thermosetting form may be prepared from castor oil and a triisocyanate. An example of suitable thermoplastic material is polyvinyl resin.

Figure 5:
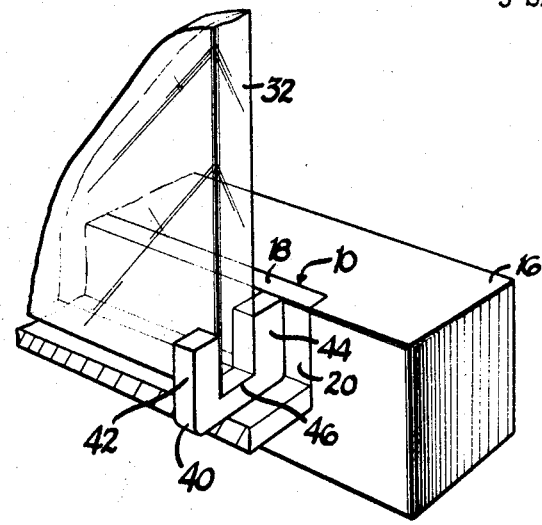
FIG. 5 illustrates another embodiment wherein a U-shaped damming member is employed.

FIG. 5 illustrates the manner in which the invention may be carried out using a different form of dam than that shown in FIGS. 1 through 4. In FIG. 5, a U-shaped damming member 40 is placed in the recess of the channel-sections frame 10 and extends transversely of that recess. The panel 32 fits tightly down between the upstanding arms 42 and 44 of the damming member such that once the panel 32 is seated within the damming member the end of the frame 10 is closed by the combination of damming member and panel. When the method is carried out using a U-shaped damming member 40, the panel 32 is placed in the frame 10 before the frame is filled with liquid damming material. Obviously, if the liquid material were injected before the panel was in place, the frame could be filled only as high as the bridge portion 46 of the damming member before the panel is inserted. The frame could be filled up the rest of the way after the panel is inserted.

Figure 6:
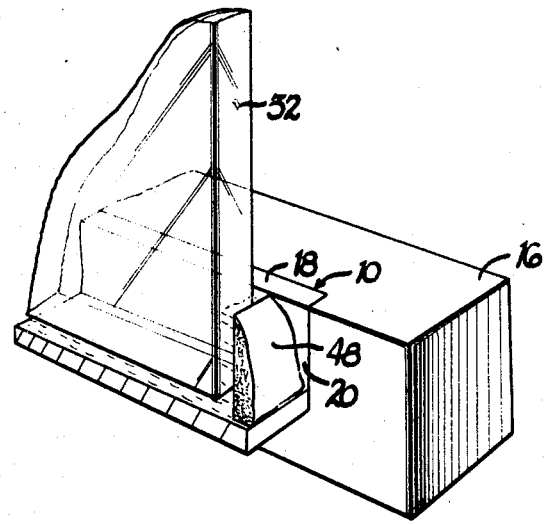
FIG. 6 illustrates how dams may be formed employing pliable material.

In FIG. 6 a pliable damming member 48 has been used in place of the more rigid damming member 26 of FIGS. 1 through 4. Even though the damming material 48 is relatively pliable, it will withsand the slight head of liquid which is provided in the frame in practicing the method. The pliable material may be a clay-like or gum-like substance. When using the pliable material 48, the method may be carried out exactly as has been described in connection with FIGS. 1–4. The only difference is that pliable material is used for the dams rather than a more rigid material.

Figure 7:
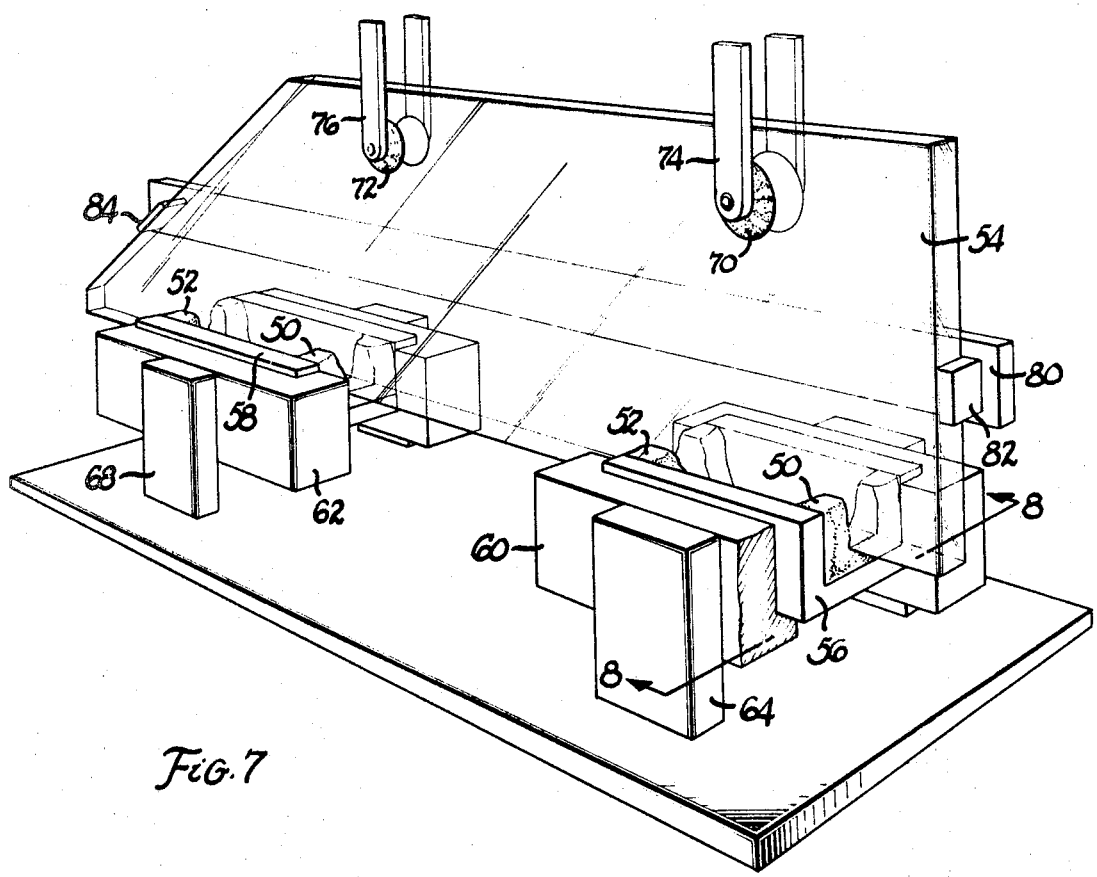
FIG. 7 is a perspective view of apparatus for bedding a glass panel in two frame members which are shorter than the edge of the panel.
Figure 8:
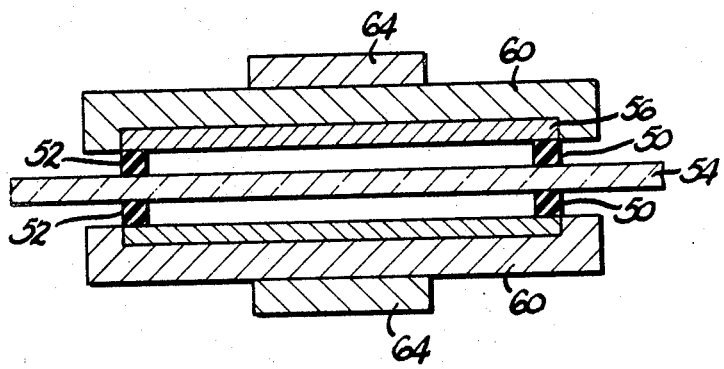
FIG. 8 is a horizontal sectional view taken through one of the frame members and associated fixtures of FIG. 7.

FIGS. 7 and 8 illustrate another embodiment of the invention wherein hunks of pliable material are used to form dams 50 and 52 for containing the bedding material. In FIG. 7, two frames 56 and 58 are shown each having dams 50 and 52 of pliable material. The dams 50 and 52 originally extend straight across the interior of the frames in the manner shown in FIG. 6, but they are displaced into a U-shaped configuration when the panel 54 is inserted. Before inserting the panel, the dammed up frames 56 and 58 are filled with liquid bedding material up to a level which allows for displacement of bedding material by the panel 54. Then the panel is inserted into both frames at once. The panel squeezes the pliable damming material and forces it to flow up the sides of the panel, and the panel also displaces some of the bedding material causing it to flow up the sides of the panel. The bedding material is cured, for example, by placing the frame and panel assembly in an oven. Other ways of heating the bedding material may be used as previously explained. The frames 56 and 58 are held in place by members 60 and 62 which in turn are braced by blocks 64 and 68. The glass panel 54 is of the type used for the side windows in automobiles. It is held in place by pairs of suction cups 70 and 72 provided on arms 74 and 76. The panel is bracketed by a positioning member 80 which has arms 82 and 84 abutting against the ends of the panel 54.

FIGS. 9 through 11 illustrate other types of damming material which may be employed in carrying out the method of the invention. In FIG. 9, a piece of adhesive tape 90 is attached to the end of the channel-section frame 10. The tape is stretched across the end of the frame and is folded back along the sides of the frame 10 a short distance to assure that the tape is held in place. The tape thus dams the end of the frame, and with a similar piece of tape applied at the opposite end of the frame it is converted into a container which will hold the liquid bedding material. The container is filled with liquid and the panel 32 is inserted into the frame and the liquid therein in the same manner as has been described in connection with FIGS. 1 through 4. The curing is also carried out in the manner described previously.

In FIG. 10, the frame 10 is dammed at one end with a removable plastic end cap 92 which fits tightly over the end of the frame. The end cap 92 has arms 94 and 96 which extend a short distance down the sides of the frame and which are self-biased against the sides of the frame to hold the cap in place. Since the cap is removable, it should be made of a material which will part from the bedding material. The cap 92 may be made for example of Teflon plastic (tetraflouroethylene) or a suitable silicone rubber.

FIG. 11 shows a modification wherein a portion 98 of a bottom wall of the channel-section frame 100 is bent up to form a dam which closes off that end of the frame. The other end of the frame has another bent-up section closing that end in the same manner. In this case, the dams are made from the material of the frame and serve the same functions as the separate damming member described previously.

Several ways of damming the frame member have been described, and in each case the dams convert the frame into a container which will hold the liquid bedding material. The edge of a panel is immersed in the liquid either by first flowing the liquid into the container and then inserting the panel, or by inserting the panel first and then introducing the liquid. Finally, the liquid is cured to a solid state by a heating step. No sealing of the frame is required, and there is no excess material to trim off. The method can be carried out with relatively little fixture apparatus to hold the various members in place. The process is clean and no cleanup steps are required at the end of the processing.

I claim:

1. A method of bedding a panel into a frame member having an interior surface forming a recess for receiving an edge portion of the panel, said method comprising the steps of damming said recess at two locations spaced from each other along the length of said frame member to form from said frame member a container capable of holding a liquid in said recess partially filling said container with liquid bedding material, then placing the marginal edge portion of said panel in said container to immerse the marginal edge portion of said panel in the liquid bedding material, said liquid bedding material being curable by heat to a solid form and being adherent to said panel and said interior surface in the solid form thereof, and heating the bedding material in said container until it is cured to the solid form thereof.

2. The method of claim 1 in which said damming step is carried out by placing bodies of damming material transversely across said interior surface at said spaced apart locations.

3. The method of claim 2 wherein said bodies of damming material are solid members.

4. The method of claim 2 wherein said bodies of damming material are pliable but retain a shape.

5. The method of claim 2 wherein said frame member has a channel section, said bodies of damming material have a U-shaped configuration and said panel edge is placed within and in contact with a U-shaped surface of each of said bodies, said bodies serving to fill the space between the edge portion of said panel and said channel surface at said spaced apart locations.

6. The method of claim 2 in which said bodies of damming material are pieces of adhesive tape.

7. The method of claim 2 in which said bodies of damming material are cap members and in which said cap members are fitted over end portions of said frame member.

8. The method of claim 2 in which said bodies of damming material are bent over portions of said frame member.

9. A method of bedding a panel into an elongate frame member having an interior channel surface forming a recess for receiving an edge portion of the panel, said method comprising the following steps without limitation to the sequence thereof: damming said recess by placing bodies of pliable damming material transversely across said channel surface at two locations spaced from each other along the length of said frame member, thereby forming a container from said frame member capable of holding a liquid therein, partially filling said container with a liquid bedding material which is curable by heat to a solid form and which is adherent to said panel and to said channel surface in the solid form thereof, placing a marginal edge portion of said panel in said container beyond the level for liquid bedding material therein but spaced from said channel surface, said edge portion squeezing said pliable damming material and displacing some of said damming material up the sides of said panel as well as displacing some of said liquid bedding material up the sides of said panel, and heating the liquid bedding material in said container to cure the same to said solid form.

10. The method of claim 9 in which said panel is bedded into two of said frame members simultaneously along the same edge of said panel by the method steps defined in claim 9.

References Cited

UNITED STATES PATENTS

| | | | |
|---|---|---|---|
| 1,111,567 | 9/1914 | Murguiondo | 249—98 X |
| 2,312,046 | 2/1943 | Neilson | 249—97 |
| 2,463,231 | 3/1949 | Wyatt | 264—313 X |
| 2,556,928 | 6/1951 | Ludlow | 249—97 |
| 2,736,067 | 2/1956 | Boschi | 264—261 |
| 3,183,290 | 5/1965 | Guarnieri et al. | 264—316 X |

FOREIGN PATENTS 946,130   1/1964   Great Britain.

ROBERT F. WHITE, Primary Examiner

T. J. CARVIS, Assistant Examiner

U.S. Cl. X.R.

264—261, 278, 313; 249—85, 97